(12) United States Patent
Herold et al.

(10) Patent No.: US 11,820,242 B2
(45) Date of Patent: Nov. 21, 2023

(54) CHARGING SOCKET RECESS OR FUEL FILLER RECESS FOR INSERTING INTO A VEHICLE BODY OPENING OF A MOTOR VEHICLE

(71) Applicant: ILLINOIS TOOL WORKS INC., Glenview, IL (US)

(72) Inventors: Tobias Herold, Reichenberg (DE); Katharina Vonbrunn, Wurzburg (DE); Ricard Fortuny, Estenfeld (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 359 days.

(21) Appl. No.: 16/816,963

(22) Filed: Mar. 12, 2020

(65) Prior Publication Data

US 2020/0298717 A1  Sep. 24, 2020

(30) Foreign Application Priority Data

Mar. 21, 2019  (DE) .......................... 102019107307.3
Aug. 29, 2019  (DE) .......................... 102019123231.7

(51) Int. Cl.
 *B60L 53/16* (2019.01)
 *H01R 13/52* (2006.01)

(52) U.S. Cl.
 CPC .......... *B60L 53/16* (2019.02); *H01R 13/5202* (2013.01); *H01R 2201/26* (2013.01)

(58) Field of Classification Search
 None
 See application file for complete search history.

(56) References Cited

U.S. PATENT DOCUMENTS

| | | |
|---|---|---|
| 2005/0063181 A1 | 3/2005 | Chiba |
| 2009/0021364 A1 | 1/2009 | Frey |
| 2010/0159317 A1 | 6/2010 | Taghikhani |
| 2010/0246198 A1 | 9/2010 | Hook |
| 2012/0111451 A1 | 5/2012 | Zentner |
| 2012/0133282 A1 | 5/2012 | Rubio |
| 2013/0078839 A1 | 3/2013 | Musk |
| 2015/0138811 A1* | 5/2015 | Salter ................ B60Q 1/2661 362/510 |
| 2017/0361761 A1* | 12/2017 | Salter ...................... F21S 43/14 |
| 2018/0334052 A1* | 11/2018 | Hwang ................ H02J 7/0047 |

FOREIGN PATENT DOCUMENTS

| | | |
|---|---|---|
| CN | 106458014 A | 2/2017 |
| CN | 207697527 U | 8/2018 |
| CN | 108622210 A | 10/2018 |

(Continued)

*Primary Examiner* — Oscar C Jimenez
(74) *Attorney, Agent, or Firm* — THOMPSON HINE LLP

(57) ABSTRACT

A charging or fueling well for insertion into a body opening of a motor vehicle, wherein the charging or fueling well has an outer well body and an inner well region, which surrounds a through opening, into which a charging plug connector for charging a battery of the motor vehicle or a fuel nozzle or tank filler pipe can be inserted. The outer well body includes, at least in some region or regions, a preferably opaque or only slightly translucent plastics material. The inner well region includes, at least in some region or regions, a transparent or translucent plastics material and is formed integrally with the material of the outer well body.

20 Claims, 5 Drawing Sheets

(56) References Cited

FOREIGN PATENT DOCUMENTS

| CN | 109070736 A | 12/2018 |
|----|----|----|
| DE | 102014104501 A1 | 10/2015 |
| DE | 102017126722 A1 | 11/2018 |
| FR | 2775351 A1 | 8/1999 |
| GB | 2528774 | 2/2016 |
| JP | 2013-233054 A | 11/2013 |

\* cited by examiner

CHARGING SOCKET RECESS OR FUEL FILLER RECESS FOR INSERTING INTO A VEHICLE BODY OPENING OF A MOTOR VEHICLE

TECHNICAL FIELD

The present invention relates to charging or fueling wells for insertion into a body opening of a motor vehicle. The motor vehicle is in particular a vehicle with a hybrid drive or an electric drive.

BACKGROUND

Vehicles with a hybrid drive or electric drive have at least one battery or a traction battery which, for example in the case of plug-in hybrid electrical vehicles (PHEV) or in the case of battery electric vehicles (BEV), can be charged by connection, for example, to an electric charging station or a conventional electrical domestic connection via an electric charging terminal which is accessible on the vehicle body from the outside and which is generally a charging socket.

The charging terminal is conventionally arranged in a charging well of the vehicle body, said charging well generally being covered or closed by a closure element. A mechanism interacting with the closure element selectively permits the opening and closing of the charging well or the opening up and shutting of the closure element relative to the charging well, and therefore access to the charging terminal.

The mechanism can contain, for example, what is referred to as push-push kinematics, as are already used in conventional fueling caps. Since, when such a mechanism is used in practice, a seal is generally missing between the closure element and the charging well, which seal would, however, be necessary for protecting the electric charging terminal, which has metallic contacts, against the penetration of dirt, dust and liquids, in particular water, and therefore for ensuring the permanent functioning capability of said charging terminal, an additional charging terminal flap which is plugged or screwed onto the charging terminal in order to protect the charging terminal is at present required.

Alternatively thereto, an annular sealing lip is arranged around the charging well. If the closure element for closing the charging well is shut, the closure element presses in the axial direction onto the sealing lip or exerts a force on the sealing lip in the axial direction in order to protect the charging well and therefore the charging terminal against the penetration of dirt, dust and liquids. In addition, use is frequently made here of a second seal, what is referred to as an "umbrella", which is arranged on the inside of the closure element and surrounds the charging terminal when the closure element is closed.

SUMMARY

It is an object of the present invention to specify a charging device which can be reliably handled for a hybrid vehicle or an electric vehicle. Furthermore, the intention is to specify a corresponding fueling device which can be reliably handled for a vehicle having an internal combustion engine.

In particular, it is an object of the invention to specify a charging or fueling well for inserting in a body opening of a motor vehicle, said charging or fueling well being constructed in a simple manner and therefore being able to be produced cost-effectively, wherein the intention at the same time is to simplify the operation of a charging or fueling device having such a charging or fueling well.

This object is achieved by the subject matter of independent patent claim 1, wherein advantageous developments of the charging or fueling well according to the invention are specified in the respective dependent claims.

Accordingly, the present invention relates in particular to a charging or fueling well for insertion into a body opening of a motor vehicle, wherein the charging or fueling well has an outer well body and an inner well region, which surrounds a through opening, into which a charging plug connector for charging a battery of the motor vehicle or a tank filler pipe or a fuel vessel can be inserted.

In particular, it is provided that the outer well body is composed, at least in some region or regions, preferably of an opaque or only slightly translucent plastics material, or comprises, at least in some region or regions, an opaque or only slightly translucent plastics material.

According to the invention, it is in particular provided that the inner well region of the charging or fueling well is composed, at least in some region or regions, of a transparent or translucent plastics material or comprises a transparent or translucent plastics material and in particular is formed integrally with the material of the outer well body.

The phrase "opaque or only slightly translucent plastics material" used here should be understood as meaning a plastics material, the transparency or translucency of which to light in the visible wavelength range and/or IR wavelength range is less, and in particular significantly less, than the transparency or translucency of the plastics material of the inner well region. The plastics material of the outer well body can be designed in particular to be opaque, i.e. impermeable with respect to light in the visible wavelength range and/or with respect to light in the IR wavelength range.

In other words, in the charging or fueling well according to the invention, the outer well body and the inner well region are formed, at least in some region or regions, in particular from different plastics materials, wherein, nevertheless, the charging or fueling well is designed as an integral component.

This can be realized, for example, by the fact that the outer well body and the inner well region are formed with the aid of a multi-component injection process, in particular a two-component injection process, and preferably at least a three-component injection process.

The entire manufacturing process is simplified because of the integral configuration of the charging or fueling well. Furthermore, the installation of the charging or fueling well in the body opening of the motor vehicle is likewise simplified.

Owing to the fact that, according to the invention, the inner well region of the charging or fueling well is formed, at least in some region or regions, from a transparent or translucent plastics material or comprises, at least in some region or regions, a transparent or translucent plastics material, it is possible to backlight said region of the charging or fueling well as required or to use said region of the charging or fueling well as a light guide structure or as part of a light guide structure, as required.

In particular, illumination is therefore possible of the through opening provided in the inner well region, or of a charging terminal optionally accommodated in the through opening, of a tank filler pipe optionally accommodated in the through opening, or of a fuel nozzle optionally accommodated in the through opening, and therefore the necessary region of the charging or fueling well is clearly visible at night or in darkness and correct introduction of a charging plug connector or of a tank filler pipe in the through opening of the well body or into a charging terminal accommodated in the through opening or into a fuel nozzle optionally accommodated in the through opening is possible.

In particular, the design of the inner well region at least in some region or regions from a transparent or translucent material permits illumination of the charging or fueling well or of the necessary regions of the charging or fueling well without construction space for a lighting device being necessary in the charging or fueling well itself.

On the contrary, with the solution according to the invention, in particular illumination and/or backlighting of the transparent or translucent material is possible, i.e. illumination of the transparent or translucent material from what is referred to as the "B side" of the charging or fueling well.

The term "A side" used here basically means the side facing the visible side of the charging or fueling well. In the installed state of the charging or fueling well, the A side of the charging or fueling well therefore corresponds to the side which faces outward. In contrast thereto, the term "B side" herein is intended to refer to that side of the charging or fueling well which is opposite the A side. In other words, the B side of the charging or fueling well is in particular a side or surface of the charging or fueling well that faces inward when the charging or fueling well is inserted into the body opening.

By the inner well region which is composed, at least in some region or regions, of the transparent or translucent plastics material or comprises the transparent or translucent plastics material, being formed integrally with the outer well body of the charging or fueling well, a maintenance-free or at least virtually maintenance-free operation of a lighting device for lighting or backlighting the transparent or translucent plastics material of the inner well region is possible since, owing to the integral formation of the outer well body with the inner well region and owing to the backlighting which can be realized, the lighting device can be arranged with the at least one light source on the B side of the charging or fueling well, wherein in addition no sealing surfaces which are to be sealed are present between the outer well body and the inner well region.

In other words, by a transparent or translucent region of the charging or fueling well being formed integrally in the charging or fueling well, a particularly compact construction of the charging or fueling well is possible, wherein it is ensured at the same time that electronics or electrics associated with the lighting device are reliably protected from external weather influences, in particular moisture.

The inner well region is preferably formed, at least in some region or regions, from a plastics material which is softer than the plastics material of the outer well body or comprises a plastics material which is softer than the plastics material of the outer well body in order to optimize an accuracy of fit of the charging plug connector or of a tank filler pipe or of a fuel nozzle in the through opening of the inner well region and in order furthermore to ensure that the outer well body is sufficiently stiff such that it can be clipped into the body opening of the vehicle.

According to embodiments of the charging or fueling well according to the invention, the inner well region has a holding ring for retaining a charging terminal accommodated or accommodatable at least in some region or regions in the through opening or a charging plug connector accommodated in the through opening or for retaining a fuel nozzle accommodated or accommodatable at least in some region or regions in the through opening. The holding ring is preferably formed from a plastics material which is harder than the material of the inner well region and is formed integrally with the plastics material of the inner well region, preferably being molded on.

Furthermore, the inner well region has a sealing region at the through opening, said sealing region being designed to rest in a sealing manner against the charging plug connector or against a tank filler pipe or fuel nozzle.

The sealing region and the inner well region are preferably composed of the same plastics material or the sealing region and the inner well region comprise the same plastics material, and are formed integrally with one another. The sealing region can have, for example, at least one sealing lip.

The outer well body of the charging or fueling well can be, for example, clipped into the body opening.

However, it is also possible to adhesively bond the outer well body of the charging or fueling well in the region of the body opening, in particular in the case of plastics bodies. Of course, however, other nonpositive and/or material connections are also suitable for fixing the charging or fueling well or the outer well body in the body opening.

The outer well body preferably has a sealing region, which is provided on an outer edge, insertable into the body opening, of the outer well body and is designed to rest in a sealing manner against the body opening. Said sealing region is preferably formed integrally with the outer well body in an injection process.

In order to be able to permit particularly reliable sealing between the outer edge of the outer well body and the body opening, the sealing region of the outer well body is preferably composed of a material which is different from the material of the outer well body and which is in particular softer than the material of the outer well body. According to preferred realizations of the charging or fueling well according to the invention, the sealing region of the outer well body is formed together with the outer well body in a multi-component injection process, in particular a two-component injection process, and preferably at least a three-component injection process.

Like the sealing region of the inner well region, the sealing region of the outer well region can also have at least one sealing lip. However, alternatively or additionally thereto, it is also conceivable for the sealing region of the inner well region and/or of the outer well body to be formed by a multiplicity of sealing laminae which are in particular of elastic design.

The body opening of the motor vehicle (for example passenger vehicle or truck), into which the charging or fueling well is insertable or is inserted, is preferably formed in a deep drawing operation, in particular a sheet-metal deep drawing operation, of the motor vehicle body. The charging or fueling well according to the invention, which is designed as an integral component with integrated sealing sections, in particular permits a particularly shallow construction, thus also allowing the deep drawn recess in the body to be made shallower.

Since, according to embodiments of the charging or fueling well according to the invention, a corresponding sealing region is formed integrally on the outer well body, said sealing region being provided on an outer edge, insertable into the body opening, of the outer well body and being designed to rest in a sealing manner against the body opening, it is ensured that said sealing region basically rests directly against the sidewall of the deep drawn recess in the body that has the body opening and therefore also serves as a means of centering the charging or fueling well. As a result, a wider tolerance is possible in the deep drawn recess during the forming of the body opening. There is no need for an additional fine blanketing step for the body opening, and therefore production costs are also reduced in this regard.

It is self-evident that the sealing region which is provided at the through opening on the inner well region and is formed integrally with the material of the inner well region also has a centering effect because of its elastic material and its resting against the charging plug connector and also allows larger tolerances at this point.

The outer well body and the inner well region of the charging or fueling well are preferably produced in a multi-component plastics injection molding process, in particular a two-component plastics injection molding process and preferably at least a three-component plastics injection molding process, in order to obtain an overall integral charging or fueling well.

According to embodiments of the present invention, it is in particular provided that the transparent or translucent plastics material of the inner well region is part of a light guide structure and is provided at least partially or at least in some region or regions on an edge region, delimiting the through opening, of the inner well region. The transparent or translucent plastics material which is part of the light guide structure is designed in particular to (again) couple out light, coupled into the light guide structure with the aid of a light source, in the longitudinal direction of the charging or fueling well, at least in some region or regions or point-wise, preferably in the edge region delimiting the through opening.

In this embodiment, the outer well body is composed, at least in some region or regions, from a first plastics material or is formed, at least in some region or regions, from a first plastics material, wherein the inner well region is composed, in some region or regions, of a (second) plastics material different from the first plastics material, which is in particular softer than the first plastics material, from which the outer well body is formed, at least in some region or regions. It is basically conceivable here for the second plastics material of the inner well region, i.e. that plastics material which is softer than the plastics material of the outer well body, also to be different from the transparent or translucent plastics material of the light guide structure.

For example, the second plastics material of the inner well region can be designed to be overall opaque or only slightly translucent, while the plastics material of the light guide structure is transparent or translucent. The transparent or translucent plastics material of the light guide structure is provided in particular at the edge region delimiting the through opening and is materially connected to the second plastics material of the inner well region. The transparent or translucent plastics material of the light guide structure is preferably molded on or on top of the second plastics material of the inner well region.

In one development of this embodiment, it is provided that the inner well region has a sealing region at the through opening, said sealing region being designed to rest in a sealing manner against the charging plug connector or against the fuel nozzle or tank filler pipe, wherein the sealing region is composed, at least in some region or regions, of the second plastics material or is formed from the same material as the second plastics material of the inner well body. In particular, the sealing region is formed integrally with the second plastics material of the inner well region, for example molded on or formed in some other way, wherein the sealing region preferably has at least one sealing lip.

According to alternative embodiments of the charging or fueling well according to the invention, it is provided that the inner well region of the charging or fueling well has a holding and/or centering ring. The holding and/or centering ring serves in particular for retaining and/or centering a charging terminal or fuel nozzle or tank filler pipe accommodated or accommodatable at least in some region or regions in the through opening.

The holding and/or centering ring is provided at least in some region or regions on an edge region delimiting the through opening and is preferably formed from a plastics material which is harder than the transparent or translucent plastics material of the inner well region.

In particular, the holding and/or centering ring is formed integrally with the transparent or translucent plastics material of the inner well region, preferably being molded on or connected materially and/or positively in some other way to the transparent or translucent plastics material of the inner well region.

In this embodiment, it is conceivable that the holding and/or centering ring is formed at least in some region or regions from a transparent or translucent plastics material which is part of a light guide structure, wherein the transparent or translucent plastics material of the holding and/or centering ring is designed to couple out light, coupled into the light guide structure with the aid of a light source, in the longitudinal direction of the charging or fueling well, at least in some region or regions or point-wise, particularly in the edge region delimiting the through opening.

Alternatively thereto, it is, however, also conceivable for a transparent or translucent plastics material to be molded on or secured positively and/or materially in some other way to the holding and/or centering ring, wherein said transparent or translucent plastics material is part of a light guide structure. In particular, the transparent or translucent plastics material is designed to couple out light, coupled into the light guide structure with the aid of a light source, in the longitudinal direction of the charging or fueling well, at least in some region or regions or point-wise, preferably in the edge region delimiting the through opening.

Also in this embodiment, it is provided, according to developments, that the inner well region has a sealing region at the through opening, said sealing region being designed to rest in a sealing manner against the charging plug connector or against the fuel nozzle or tank filler pipe, wherein the sealing region and the inner well region are composed of the same material and are formed integrally with one another, and wherein the sealing region preferably has at least one sealing lip.

According to advantageous realizations of the charging or fueling well according to the invention, which is provided with a light guide structure, it is provided that the charging or fueling well has a lighting device having at least one light source in order either to backlight the transparent or translucent plastics material of the inner well region, or to couple light into the transparent or translucent plastics material of the inner well region. The at least one light source is designed in particular to emit light in the visible wavelength range, or light in the infrared range.

In this variant embodiment, it is conceivable that at least one receptacle for accommodating the at least one light source of the lighting device, in particular in an exchangeable manner, is provided, preferably in a peripheral edge region of the inner well region.

The at least one light source of the lighting device is, for example, designed for indirectly backlighting the transparent or translucent plastics material of the inner well region or for coupling light into the transparent or translucent plastics material of the inner well region.

It is appropriate here that the transparent or translucent plastics material of the inner well region is embodied at least in some region or regions as a light guide or is part of a light guide structure, via which light coupled into the transparent or translucent plastics material of the inner well region with the aid of the at least one light source can be guided to at least one light emission surface of the transparent or translucent plastics material.

The transparent or translucent plastics material preferably has a multiplicity of light emission surfaces at the edge region delimiting the through opening. The at least one light emission surface or the multiplicity of light emission surfaces is/are preferably configured in such a way (with respect to the emission surface shaping) and/or arranged in such a way with respect to the through opening that it/they serves/serve as a reference marker for an optical detection system (camera) of a manipulator for automatic charging.

According to realizations of the present invention, the charging or fueling well may comprise a hinge arm which is connected pivotably to the outer well body and supports a charging or fueling flap. The hinge arm supports the charging or fueling flap. By pivoting of the hinge arm, the charging or fueling well can either be closed or opened for an electrical charging operation or refueling operation in a manner known per se with the charging or fueling flap. The charging or fueling flap can be connected integrally to the hinge arm or can be designed as a separate component connected to the hinge arm.

For example, it may be desirable to manufacture the charging or fueling flap from the same body sheet as the surrounding outer skin of the motor vehicle body. The hinge arm may at the same time be composed of a plastic.

The charging or fueling well can furthermore comprise a push-push locking device for locking and unlocking or opening the charging or fueling flap. Push-push locking devices of this type are known per se. The charging or fueling flap has to be pressed for a certain distance into the charging or fueling well for unlocking purposes. As a result, a certain depth of the charging or fueling well is necessary. Against this background, the small depth permitted according to the invention of the deep drawn recess having the body opening is particularly advantageous since a low construction depth can be realized overall even when a push-push locking device is provided.

Of course, solutions without a push-push unlocking device are also possible, for example by means of engagement in the charging or fueling flap for manual opening.

The charging or fueling well can have a lighting device with at least one light source in order to backlight the transparent or translucent material of the inner well region as required. The at least one light source of the lighting device can be assigned a control device which is designed to activate the at least one light source of the lighting device in such a manner that the lighting parameters of the at least one light source can be varied, specifically in particular in accordance with a charge state of the battery of the motor vehicle and/or in accordance with a state of the charging plug connector or of the tank filler pipe and/or in accordance with a tank filling level.

The lighting parameters which can be varied with the aid of the control device assigned to the at least one light source are in particular a wavelength (color) of the light emitted by the at least one light source, an intensity (brightness) of the light emitted by the at least one light source, a flashing frequency of the light emitted by the at least one light source, and/or a pulse shape and/or pulse frequency of the light emitted by the at least one light source.

Owing to the fact that, according to the invention, the inner well region of the charging or fueling well is formed at least in parts and/or in some region or regions from a transparent or translucent material which can be backlit with the aid of at least one light source as required, the through opening provided in the inner well region or a charging terminal accommodated in the through opening can be illuminated.

With the solution according to the invention, not only is the inner well region suitably illuminated, which has an advantageous effect when preparing a charging operation in particular in the dark, but also further functionalities can be realized, in particular the further functionality of displaying the charging state of the battery and/or displaying a state of the charging plug connector or of the tank filler pipe and/or of a tank filling level.

For this purpose, according to embodiments of the invention, the at least one light source of the lighting device is assigned a control device which varies at least one lighting parameter of the at least one light source in accordance with a charge state of the battery and/or in accordance with a state of the charging plug connector or of the tank filler pipe and/or in accordance with a tank filling level.

For example, it is conceivable that, in a state if a closure element (for example a closure flap) assigned to the charging or fueling well is open, the control device activates the at least one light source of the lighting device in such a manner that white light is emitted by the light source in order thereby to permit particularly optimum illumination of the inner well region.

Furthermore, it is conceivable that the control device activates the at least one light source in such a manner that the at least one light source emits the light with a certain flashing frequency if it is detected with the aid of a suitable sensor arrangement that a charging plug connector or a tank filler pipe is not accommodated or is not correctly accommodated in the through opening or in a charging terminal or fuel nozzle accommodated in the through opening.

Furthermore, it is conceivable that the control device varies the wavelength (color) of the light emitted by the at least one light source in accordance with a charge state of the battery, detected with the aid of a corresponding sensor arrangement, or in accordance with a filling level of a (fuel) tank, detected with the aid of a corresponding sensor arrangement.

Of course, other display options are also conceivable. It is essential in this connection that the lighting device serves not only for illuminating the inner well region but at the same time can also act as a charging display light, state display light and/or tank filling level display light.

The charging or fueling well thereby takes on a plurality of additional functions, and therefore separate display devices, in particular separate charging or tank filling level display lights, can be dispensed with. Overall, the charging or fueling well according to the invention is therefore distinguished by its compact construction, wherein, nonetheless, a plurality of additional functions can be integrated in the charging well or fueling well or can be realized with the aid of the charging or fueling well.

According to preferred realizations of the charging or fueling well according to the invention, it is provided that the transparent or translucent region or the transparent or translucent material is provided, at least in some region or regions, in a peripheral edge region of the through opening. Optimum illumination of the through opening or of a charging terminal accommodated at least in some region or regions in the through opening or of a tank filler pipe accommodated at least in some region or regions in the through opening can thereby be ensured, which simplifies and in particular ensures a correct connection of the charging terminal to a charging plug connector for charging a battery or correct connection of the tank filler pipe to a fuel nozzle for refueling a fuel tank.

Different variations are suitable for backlighting the transparent or translucent material of the well body.

For example, it is conceivable that the at least one light source of the lighting device is designed to directly backlight the transparent or translucent material. In other words, in this embodiment, the at least one light source is arranged in the immediate vicinity on the B side of the transparent or translucent material so that the light emitted by the light source can be coupled directly into the transparent or translucent material.

It is appropriate in this connection, for example, that at least one receptacle, for example in the form of a receiving well or in the form of a receiving channel for accommodating the at least one light source, is provided in a peripheral edge region of the transparent or translucent material. A secure and compact fixing of the at least one light source on the inner well region is thereby possible without additional support elements or the like being necessary for this purpose.

However, alternatively to a direct backlighting of the transparent or translucent material, an indirect backlighting with the aid of the at least one light source is also conceivable.

In this connection, it is appropriate, for example, that the lighting device has at least one light guide via which light from the at least one light source arranged away from the transparent or translucent material can be guided to an emission surface of the transparent or translucent material.

The at least one light guide is designed here to transport the previously coupled-in light of the at least one light source within the light guide by means of total reflection (TIR).

Suitable material for the at least one light guide includes in particular transparent PMMA or polycarbonate. Use is preferably made of a multiplicity of light guides in order to be able to achieve as uniform an illumination of the transparent or translucent material as possible.

According to embodiments of the charging or fueling well according to the invention, use is made of a multiplicity of light guides each having a diameter of 0.1 to 0.3 mm and in particular of 0.2 to 0.25 mm. It is thereby ensured that the light guides are of particularly flexible design, and therefore they can easily be laid or guided around corners and edges, which may be of advantage because of the only small construction space available within the body of a vehicle.

Alternatively thereto, it is, however, also conceivable if the at least one light guide of the lighting device for indirectly backlighting the transparent or translucent material is formed by the transparent or translucent material itself. In other words, in this embodiment, there is no actual interface between the end region of the at least one light guide and the transparent or translucent material, via which interface the light transmitted by the at least one light guide has to be coupled into the transparent or translucent material. On the contrary, in this embodiment, the light is coupled out of the at least one light guide or the transparent or translucent material in such a manner that a surface of the transparent or translucent material, which surface in particular faces away from the lighting device, is treated at least in such a manner that there are discontinuities for coupling out light.

In particular, it is conceivable in this connection that the surface of the transparent or translucent material in particular facing away from the lighting device is treated at least in some region or regions in such a manner that discontinuities which prevent the TIR condition are generated at least on part of the transparent or translucent material. It is thereby possible to couple light out of the transparent or translucent material in a targeted manner.

The generating of discontinuities, which is occasionally also referred to as "activating" the at least one light guide or the transparent or translucent material, takes place, for example, by sandblasting the region or some regions or roughening the surface of the transparent or translucent material facing away from the lighting device in some other way. It is apparent in this case that by activating the transparent or translucent material on the A side of the charging or fueling well or of the well body in a targeted manner and in some region or regions, a predetermined or predeterminable pattern of discontinuities can be produced. Since the TIR conditions are prevented at said discontinuities, the light coupled into the transparent or translucent material is at least partially coupled out here.

Accordingly, it should be pointed out that personalized lighting solutions can also be realized in a manner which is particularly simple to realize but is nevertheless effective, wherein the lighting effects designed by a car manufacturer can be realized in particular in a cost-effective and simple manner.

As already indicated previously, according to developments of the charging or fueling well according to the invention, the charging or fueling well can have a closure element, for example in the form of a cap, which is articulated on the outer well body and is designed to expose or cover at least the through opening for the charging plug connector or a charging terminal/fuel nozzle, which is accommodated at least in some region or regions in the through opening, as required.

It would basically be conceivable here for a control device to be provided which can be designed to vary one of the lighting parameters mentioned at the beginning for the at least one light source in accordance with a position of the closure element relative to the charging or fueling well, which position can be detected with the aid of a corresponding sensor arrangement.

The invention also relates to a motor vehicle comprising a charging or fueling well according to the invention which is inserted into a body opening of the motor vehicle.

BRIEF DESCRIPTION OF THE DRAWINGS

Exemplary embodiments of the charging or fueling well according to the invention will be described in more detail below with reference to the attached drawings, in which.

Figure 1:
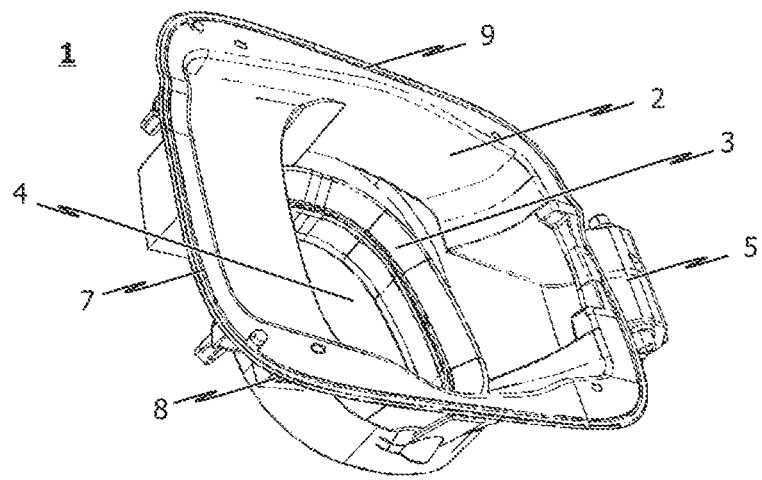
FIG. 1 shows schematically and in an isometric view a first exemplary embodiment of the charging or fueling well according to the invention.

Unless stated otherwise, identical reference signs denote identical items in the figures.

DETAILED DESCRIPTION

The charging or fueling wells 1 shown in the drawings are composed of plastic and are in particular formed integrally overall. Each charging or fueling well 1 has an outer well body 2 made of a relatively firm plastics material and an inner well region 3 made of a plastics material which is softer than the plastics material of the outer well body.

The charging wells 1 are overall of pot-shaped design and have an outer edge 9 which is predetermined by the outer well body 2 and with which the charging or fueling well 1 can be inserted, for example clipped, into a body opening of a motor vehicle.

Therefore, corresponding latching means 8 (clips) are formed integrally on the outer well body 2 for securing the charging or fueling well 1 on the body opening, in particular a deep drawn recess in the body.

The outer edge 9 of the outer well body 2 is provided with a sealing region 7 which, in the examples shown in the drawings, comprises an encircling sealing lip formed on the outer edge 9. However, instead of such a sealing lip, it is also conceivable to form a plurality of sealing lamellae on the outer edge 9, which sealing lamellae are each separated from one another at regular circumferential intervals by a slot.

In the exemplary embodiments shown in the drawings, the sealing region 7 is formed integrally on the outer edge 9 of the outer well body 2 (i.e. the sealing lip) with the material of the outer well body 2. In particular, the sealing region 7 is formed from a plastics material which is softer than the plastics material of the outer well body 2 and is correspondingly molded on the outer edge 9 of the outer well body 2 or is formed during a multi-component injection molding process, in particular two-component and preferably three-component injection molding process.

The charging or fueling well 1 has, in addition to the outer well body 2, the inner well region 3 which has already been mentioned and which is formed materially, i.e. integrally, with the outer well body 2 preferably during a multi-component injection process, in particular a two-component, and preferably a three-component injection process.

The inner well region 3 according to the embodiments of the charging or fueling well 1 that are shown in FIG. 1 to FIG. 6 is composed of a transparent or translucent plastics material or comprises a transparent or translucent plastics material which is overall softer than the plastics material of the outer well body 2.

In particular, the inner well region 3 is formed at least in some region or regions from a soft-component plastics material, such as, for example, polyamide material, polyurethane material, silicone material, rubber material, natural rubber material, EPDM material, PA material or PVC material.

For example, the inner well region 3 can be formed from a transparent or translucent polyamide material, polyurethane material, silicone material, rubber material, natural rubber material, EPDM material, PA material or PVC material, wherein, however, other transparent or translucent plastics materials are, of course, basically also suitable.

The inner well region 3 formed from the transparent or translucent plastics material according to the embodiments of the charging or fueling well 1 that are shown in FIG. 1 to FIG. 6 surrounds a through opening 4, into which a charging plug connector for charging a battery of the motor vehicle or a fuel nozzle or tank filler pipe for refueling a fuel tank can be inserted.

The through opening 4 is delimited by a further sealing region 6 which is an integral part of the inner well region 3. In detail, in the embodiments shown in the drawings, said sealing region 6 is formed by at least one sealing lip which runs around the through opening 4 and can be formed from the same material as the inner well region 3 and which is preferably formed integrally with the inner well region 3.

A sealing region 6 which can be part of a closure flap (not illustrated in the drawings) is formed integrally on the outer well body 2. The charging or fueling well 1 can either be closed or opened up by the closure flap.

The closure flap is, for example, a charging or fueling flap which is arranged with the hinge arm 5 on the outer well body 2 in such a manner that the charging or fueling flap can be opened up and shut relative to the charging or fueling well 1.

An opening and closure mechanism can be arranged on that side of the charging or fueling flap, which is opposite the hinge arm 5, said opening and closure mechanism being able to comprise push-push kinematics acting in the direction of the longitudinal axis of the charging or fueling well 1, i.e. the actuating direction of the push-push kinematics takes place in the direction of the longitudinal axis. By means of a force exerted on the opening and closure mechanism in the direction of the longitudinal axis, the mechanism can be unlocked and the charging or fueling flap can be opened or opened up or the shut charging or fueling flap can be locked.

The exemplary embodiments of the charging or fueling well 1 according to the invention that are shown in FIG. 1 to FIG. 6 each have an inner well region 3, wherein said inner well region 3 is formed at least in parts and/or in some region or regions from a transparent or translucent material. In the exemplary embodiments according to FIG. 1 to FIG. 6, the transparent or translucent material is provided at least in some region or regions in a peripheral edge region of the through opening 4 of the inner well region 3, in which the charging terminal or fuel nozzle is accommodated, at least in some region or regions.

A lighting device can be provided in each case in the charging or fueling wells 1 shown in the drawings. The lighting device can be assigned a light source which is designed to backlight the transparent or translucent material of the inner well region 3.

Furthermore, the light source of the lighting device can be assigned a control device which is designed for varying at least one lighting parameter of the light source, preferably in accordance with a charge state of the battery, not shown in the drawings, and/or in accordance with a state of a charging plug connector/tank filler pipe and/or in accordance with a fuel filling level.

Figure 2:
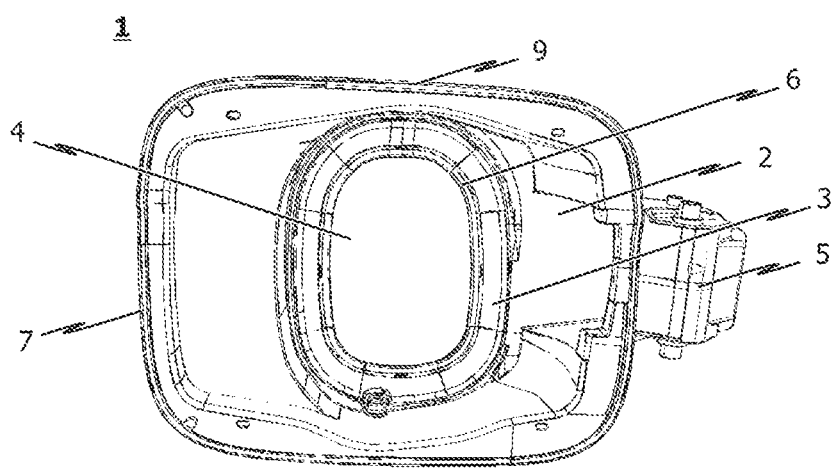
FIG. 2 shows schematically and in a top view the exemplary embodiment of the charging or fueling well according to the invention according to FIG. 1.
Figure 3:
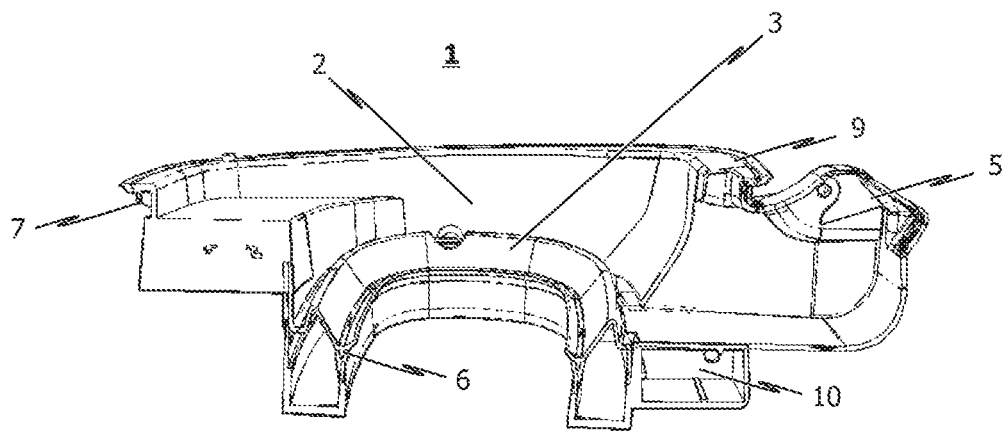
FIG. 3 shows schematically and in an isometric sectional view the exemplary embodiment of the charging or fueling well according to the invention according to FIG. 1.

In the embodiment shown in FIG. 1 to FIG. 3, the light source of the lighting device can be designed in particular to indirectly backlight the transparent or translucent material of the inner well region 3.

For this purpose, the lighting device can have a light guide or a light guide device, via which light guide or via which light guide device light from the light source arranged away from the transparent or translucent material of the inner well region 3 can be guided to an emission surface of the transparent or translucent material.

In detail, it can be provided, for example in the embodiment shown in FIG. 1 to FIG. 3, that the light guide or the light guide device is formed by the transparent or translucent material of the inner well region 3 itself. In other words, in this embodiment, the transparent or translucent material of the inner well region 3 can be part of the light guide or part of a light guide structure.

Of course, however, embodiments are also conceivable in which a separate light guide or a separate light guide device is used, wherein a coupling-out side of the separate light guide or of the separate light guide device is optically connected to the transparent or translucent material of the inner well region 3.

Figure 4:
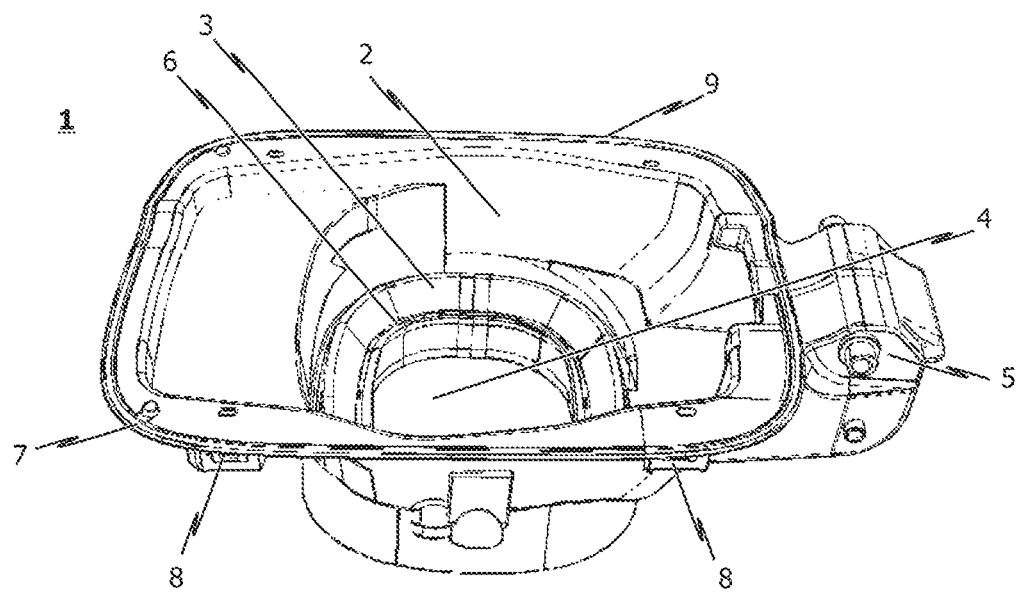
FIG. 4 shows schematically and in an isometric view a charging or fueling well according to a second exemplary embodiment of the invention.
Figure 5:
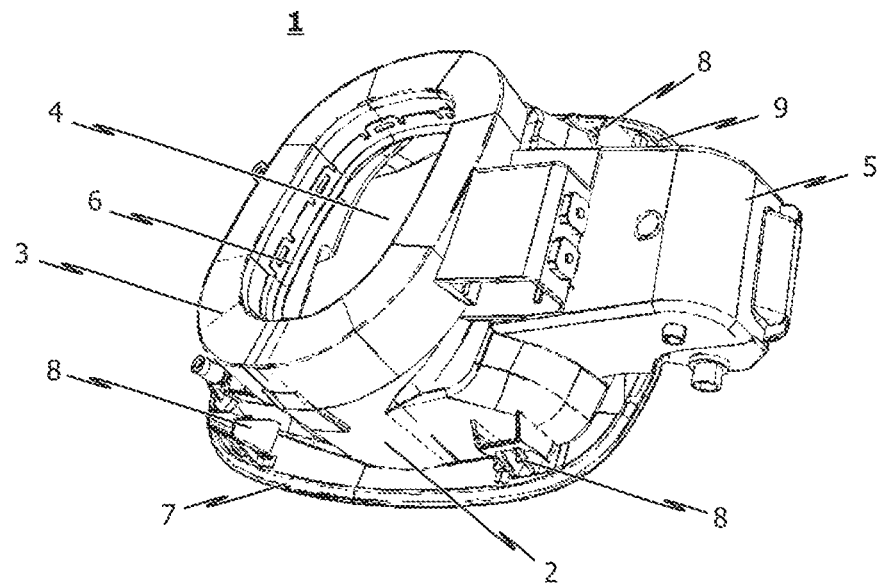
FIG. 5 shows schematically in an isometric view of the B side the exemplary embodiment of the charging or fueling well according to the invention according to FIG. 3.
Figure 6:
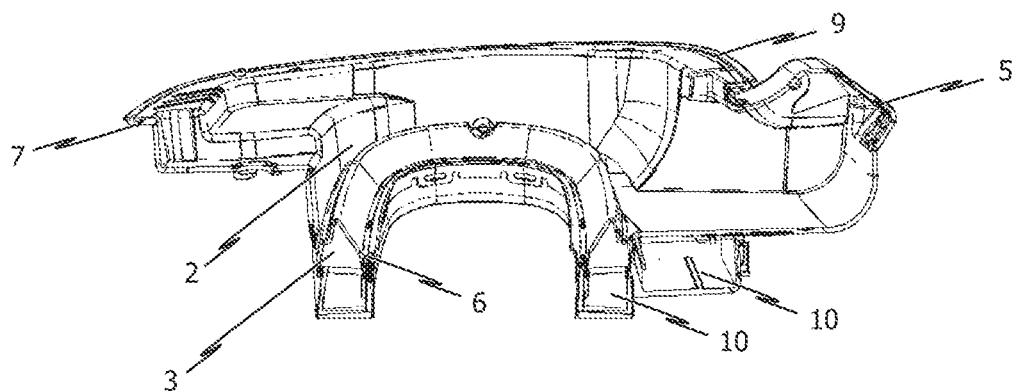
FIG. 6 shows schematically and in an isometric sectional view the exemplary embodiment of the charging or fueling well according to the invention according to FIG. 3.

In particular in the embodiment shown in FIG. 4 to FIG. 6, it can be provided that the lighting device is arranged with the light source itself on the B side of the inner well region 3. This has the advantage that no additional securing supports, etc. for the light source are necessary.

Of course, the invention is not, however, limited to such an embodiment. On the contrary, the light source can also be arranged and held on a separate support.

In detail, in the embodiment shown in FIG. 4 to FIG. 6, a receptacle 10 is provided for the at least one light source (in particular LED light chain), wherein the receptacle 10 is embodied as a channel which runs around the inner well region 3, at least in some region or regions, and is formed integrally with the material of the inner well region 3. The transparent or translucent material of the inner well region 3 can thereby be directly backlit with the aid of the light source of the lighting device.

Further exemplary embodiments of the charging or fueling well 1 according to the invention will be described in more detail below with reference to the schematic sectional views in FIG. 7 to FIG. 10.

Although the edge region 11, delimiting the through opening 4, of the inner well region 3 is illustrated only schematically and in sections in FIG. 7 to FIG. 10, it should be noted that the inner well region 3 in these embodiments is or can be part of a charging or fueling well, for example a charging or fueling well 1 according to the embodiment shown in FIG. 1 to FIG. 6.

The inner well region 3 surrounds a through opening 4, into which a charging plug connector for charging a battery of the motor vehicle, or a fuel nozzle or a tank filler pipe can be inserted. Although the outer well body of the charging or fueling well is not illustrated in FIG. 7 to FIG. 10, it is conceivable (but not absolutely required) for the outer well body of the charging or fueling well to be formed, at least in some region or regions, from an opaque or only slightly translucent plastics material.

In the embodiments according to FIG. 7 to FIG. 10, it is provided that the inner well region 3 is composed, at least in some region or regions, of a transparent or translucent plastics material or comprises a transparent or translucent plastics material and is preferably formed integrally with the material of the outer well body.

In particular, it is conceivable in this connection that the outer well body is formed, at least in some region or regions, from a first plastics material, and the inner well region 3 is formed, at least in some region or regions, from at least one (second) plastics material which is different from the first plastics material, wherein the outer well body and the inner well region 3 are formed in a multi-component injection process, in particular a two-component injection process, and preferably a three-component injection process.

Figure 7:
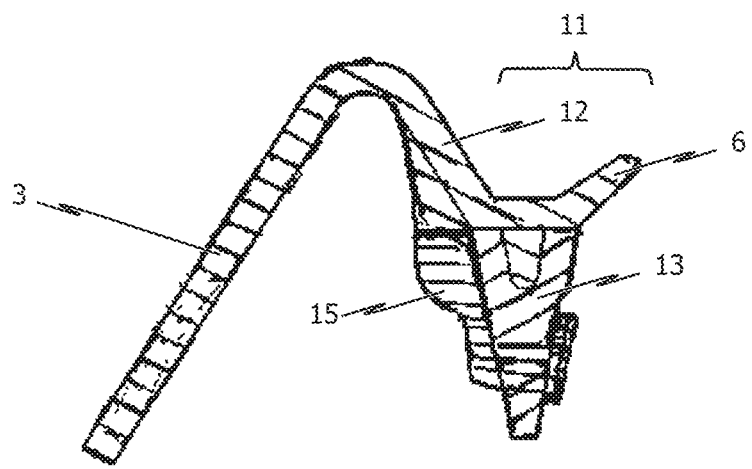
FIG. 7 shows schematically and in a sectional view the edge region, delimiting a through opening, of an inner well region of a further embodiment of the charging or fueling well according to the invention.

In the embodiment shown in FIG. 7, the inner well region 3 is formed from a transparent soft-component plastics material 12.

As illustrated in FIG. 7, the inner well region 3 has a sealing region 6 in the form of a sealing lip at the through opening 4, wherein the sealing region 6 or the sealing lip is designed to rest in a sealing manner against a charging plug connector or against a fuel nozzle or a tank filler pipe. In this embodiment, the sealing region 6 or the sealing lip and the inner well region 3 comprise the same transparent soft-component plastics material 12 and are formed integrally with one another.

In the embodiment according to FIG. 7, the inner well region 3 has a holding and/or centering ring 13. The holding and/or centering ring 13 serves for retaining and/or centering a charging terminal or fuel nozzle or tank filler pipe accommodated or accommodatable at least in some region or regions in the through opening 4.

In detail, in the embodiment according to FIG. 7, the holding and/or centering ring 13 is provided at least in some region or regions on an edge region 11, delimiting the through opening 4, of the inner well region 3.

The holding and/or centering ring 13 is formed from a plastics material 14 which is harder than the transparent soft-component plastics material 12 of the inner well region 3 and, in particular, is formed integrally with the transparent soft-component plastics material 12 of the inner well region 3, preferably being molded on or connected materially and/or positively in some other way to the transparent soft-component plastics material 12 of the inner well region 3.

In the embodiment according to FIG. 7, it is provided in particular that a transparent or translucent plastics material 15 is molded onto the holding and/or centering ring 13 or secured positively and/or materially thereto in some other way, wherein said transparent or translucent plastics material 15 is part of a light guide structure and is designed to couple out light, coupled into the light guide structure with the aid of a light source, in the longitudinal direction of the charging or fueling well, at least in some region or regions or point-wise, particularly in the edge region 11 delimiting the through opening 4.

Figure 8:
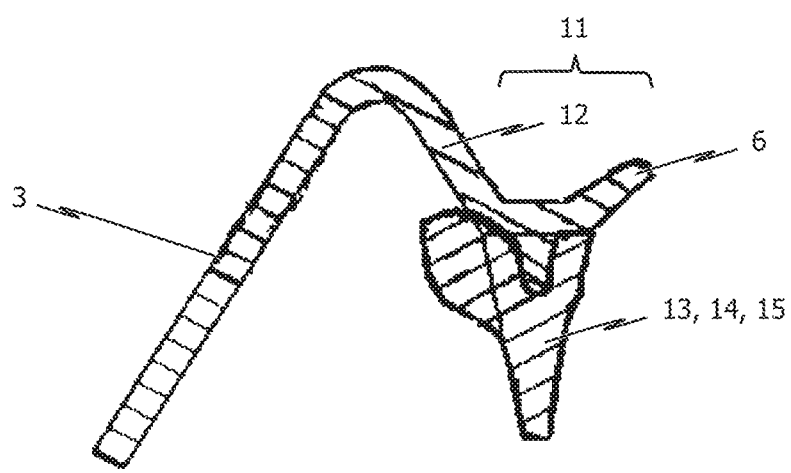
FIG. 8 shows schematically and in a sectional view the edge region, delimiting a through opening, of an inner well region of a further embodiment of the charging or fueling well according to the invention.

As also in the case of the embodiment shown in FIG. 7, in the embodiment shown schematically in FIG. 8 it is provided that the inner well region 3 is formed from a transparent soft-component plastics material 12.

However, in contrast to the embodiment according to FIG. 7, in the embodiment according to FIG. 8 it is provided that the holding and/or centering ring 13 itself is part of a light guide structure. In other words, in the embodiment according to FIG. 8, a transparent or translucent plastics material (transparent or translucent plastics material 15 in FIG. 7) is not molded onto the holding and/or centering ring 13 or secured positively and/or materially in some other way, but rather the holding and/or centering ring 13 is formed, at least in some region or regions, from a transparent or translucent plastics material, wherein said transparent or translucent plastics material of the holding and/or centering ring 13 is part of a light guide structure.

The transparent or translucent plastics material of the holding and/or centering ring 13 is designed to couple out light, coupled into the light guide structure, in the longitudinal direction of the charging or fueling well, at least in some region or regions or point-wise, particularly in the edge region 11 delimiting the through opening 4.

Figure 9:
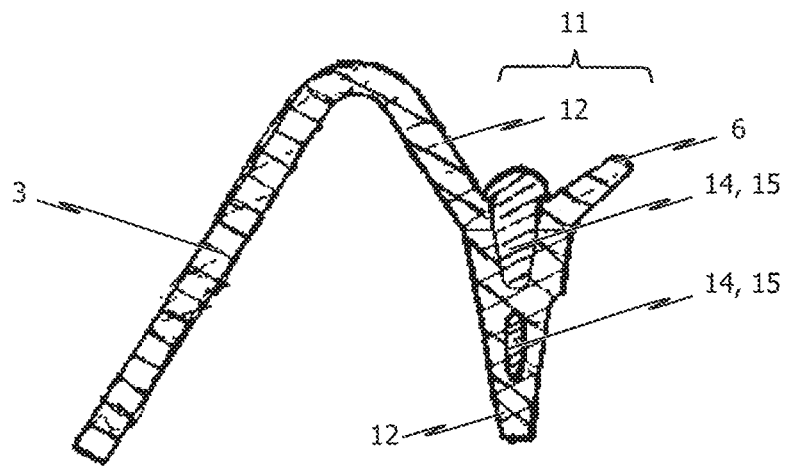
FIG. 9 shows schematically and in a sectional view the edge region, delimiting a through opening, of an inner well region of a further embodiment of the charging or fueling well according to the invention.

In the embodiment illustrated schematically in FIG. 9, the inner well region 3 is substantially formed from an opaque (for example black) soft-component plastics material 12, wherein the inner well region 3, in some region or regions and in particular at the edge region 11 delimiting the through opening 4, is additionally composed, in some region or regions, from a (different) transparent or translucent plastics material 15.

The transparent or translucent plastics material 15 is arranged in particular on the A side of the inner well region 3, i.e. is visible from the outside to the observer.

The transparent or translucent plastics material 15 of the inner well region 3 is part of a light guide structure and is provided at least in parts or in some region or regions on an edge region 11, delimiting the through opening 4, of the inner well region 3.

The transparent or translucent plastics material 15, which is or can be part of a light guide structure, is designed in particular to couple out light, coupled into the light guide structure with the aid of a light source, in the longitudinal direction of the charging or fueling well (i.e. in the direction of the A side of the inner well region 3), at least in some region or regions or point-wise, preferably in the edge region 11 delimiting the through opening 4.

In the embodiment shown in FIG. 9, it is provided in particular that the outer well body (not shown there) is composed or formed, at least in some region or regions, of or from a first hard-component plastics material, wherein the inner well region 3 is composed, in some region or regions, of an, in particular softer, second plastics material (soft-component plastics material 12) which is different from the first hard-component plastics material and is different from the transparent or translucent plastics material 15 of the light guide structure.

The transparent or translucent plastics material 15 of the light guide structure is preferably provided here in particular in the edge region 11 delimiting the through opening 4, and is connected materially to the second plastics material, i.e. to the opaque soft-component plastics material 12 of the inner well region 3, in particular molded on or on top.

As illustrated schematically in FIG. 9, the inner well region 3 has a sealing region 6 at the through opening 4, said sealing region being designed to rest in a sealing manner against a charging plug connector or against a fuel nozzle or a tank filler pipe.

The sealing region 6 is formed, at least in some region or regions, from the second plastics material, i.e. the opaque soft-component plastics material 12 of the inner well region 3 and is formed integrally with the inner well region 3 or the second plastics material of the well region 3.

As in the embodiments according to FIG. 7 and FIG. 8, in the embodiment according to FIG. 9 the sealing region 6 is preferably in the form of at least one sealing lip.

Figure 10:
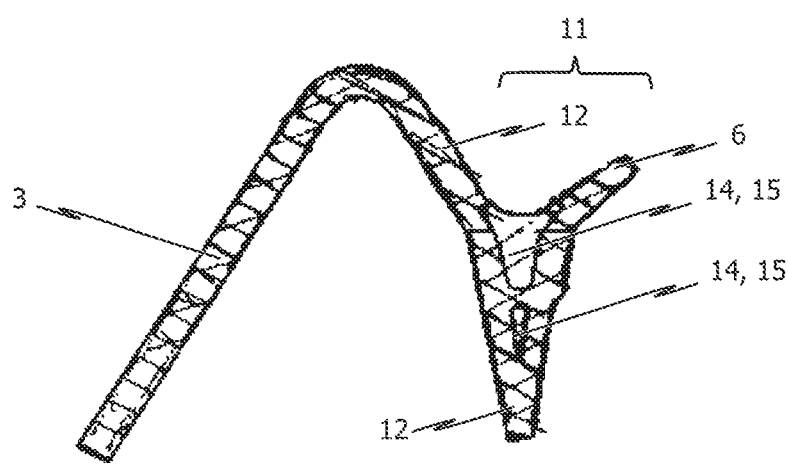
FIG. 10 shows schematically and in a sectional view the edge region, delimiting a through opening, of an inner well region of a further embodiment of the charging or fueling well according to the invention.

The embodiment illustrated schematically in FIG. 10 substantially corresponds to the previously described embodiment according to FIG. 9, wherein, however, in the embodiment according to FIG. 10, the transparent or translucent plastics material 15 of the light guide structure is injected onto or on top of the opaque soft-component plastics material 12 of the inner well region 3 whereas, in the embodiment according to FIG. 9, the transparent or translucent plastics material of the light guide structure is materially connected by adhesion to the soft-component plastics material 12 of the inner well region 3.

In the embodiments according to FIG. 9 and FIG. 10, it is preferably provided that the transparent or translucent plastics material 15 of the light guide structure is composed of a material which is harder than the soft-component plastics material 12 of the inner well region 3.

In this connection, it is appropriate that the transparent or translucent plastics material 15 is also formed integrally within the soft-component plastics material 12 of the inner well region 3 in order thus to form a centering or holding ring integrally in the soft-component plastics material 12 of the inner well region 3 in the edge region 11 which surrounds the through opening 4.

In the embodiments according to FIG. 7 to FIG. 10, the transparent or translucent plastics material of the inner well region 3 serves, at least in some region or regions, as a light guide structure. Although not illustrated in FIG. 7 to FIG. 10, a lighting device with at least one light source is preferably provided in order to backlight the transparent or translucent plastics material 15 of the inner well region, which plastics material serves as a light guide structure, or in order to couple light into said transparent or translucent plastics material.

The at least one light source is designed in particular to emit light in the visible wavelength range. According to embodiments of the invention, the at least one light source may, however, also be designed in order to emit light in the infrared (IR) range.

The transparent or translucent plastics material of the inner well region 3, which plastics material serves as a light guide structure or as part of a light guide structure, preferably has a multiplicity of light emission surfaces which are provided in particular on that edge region 11 of the inner well region 3 which delimits the through opening 4.

In this connection, it is conceivable for the at least one light emission surface to be configured in such a way in respect of its size and/or shaping and/or to be arranged in such a way with respect to the through opening 4 that it serves as a reference marker for an optical detection system of a manipulator (robot arm) for automatic charging.

The invention is not limited to the embodiments shown in the drawings, but rather emerges from an overall view of all of the features which are disclosed here.

LIST OF REFERENCE SIGNS

1 Charging or fueling well
2 outer well body
3 inner well region
4 Through opening
5 Hinge arm
6 Sealing region of the inner well region
7 Sealing region of the outer well body
8 Latching means
9 outer edge of the well body
10 Receptacle
11 inner edge region of the inner well region 12 Soft-component plastics material
13 Holding and/or centering ring
14 Hard-component plastics material
15 transparent or translucent plastics material

The invention claimed is:

1. A charging or fueling well for insertion into a body opening of a motor vehicle, wherein the charging or fueling well has an outer well body and an inner well region, which surrounds a through opening, into which a charging plug connector for charging a battery of the motor vehicle or a fuel nozzle or tank filler pipe can be inserted, wherein the outer well body is composed, at least in some region or regions, of an opaque or only slightly translucent plastics material, and the inner well region is composed, at least in some region or regions, of a transparent or translucent plastics material or comprises a transparent or translucent plastics material and is formed integrally with the material of the outer well body, wherein the transparent or translucent plastics material of the inner well region completely surrounds the through opening, wherein the inner well region is located axially below the outer well body and the outer well body includes portions that extend axially down toward the inner well region.

2. The charging or fueling well as claimed in claim 1, wherein the outer well body is formed, at least in some region or regions, from a first plastics material, and the inner well region is formed, at least in some region or regions, from at least one second plastics material different from the first plastics material, and wherein the outer well body and the inner well region are formed in a multi-component injection process.

3. The charging or fueling well as claimed in claim 1, wherein the transparent or translucent plastics material of the inner well region is part of a light guide structure and is provided at least partially or at least in some region or regions on an edge region, delimiting the through opening, of the inner well region, and is designed to couple out light, coupled into the light guide structure with the aid of a light source, in the longitudinal direction of the charging or fueling well in the edge region delimiting the through opening.

4. The charging or fueling well as claimed in claim 3, wherein the outer well body is composed of or formed, at least in some region or regions, from a first plastics material and the inner well region is composed, at least in some region or regions, of a second plastics material that is softer than the first plastics material, which is different from the transparent or translucent plastics material of the light guide structure, wherein the transparent or translucent plastics material of the light guide structure is molded on the edge region delimiting the through opening.

5. The charging or fueling well as claimed in claim 4, wherein the inner well region has a sealing region at the through opening, said sealing region being designed to rest in a sealing manner against the charging plug connector or against the fuel nozzle or tank filler pipe, wherein the sealing region is composed, at least in some region or regions, of the second plastics material and is formed integrally with the second plastics material of the inner well region, wherein the sealing region has at least one sealing lip.

6. The charging or fueling well as claimed in claim 1, wherein the inner well region has a holding and/or centering ring for retaining and/or centering a charging terminal or fuel nozzle or tank filler pipe accommodated or accommodatable at least in some region or regions in the through opening, wherein the holding and/or centering ring is provided in at least some region or regions on an edge region delimiting the through opening and is formed from a plastics material which is harder than the plastics material of the inner well region and molded on or connected materially and/or positively in some other way to the plastics material of the inner well region.

7. The charging or fueling well as claimed in claim 6, wherein the holding and/or centering ring is formed at least in some region or regions from a transparent or translucent plastics material which is part of a light guide structure,
wherein the transparent or translucent plastics material of the holding and/or centering ring is designed to couple out light, coupled into the light guide structure with the aid of a light source, in the longitudinal direction of the charging or fueling well in the edge region delimiting the through opening; or
wherein a transparent or translucent plastics material is molded on or secured materially and/or positively in some other way to the holding and/or centering ring, wherein the transparent or translucent plastics material is part of a light guide structure and is designed to couple out light, coupled into the light guide structure with the aid of a light source, in the longitudinal direction of the charging or fueling well in the edge region delimiting the through opening.

8. The charging or fueling well as claimed in claim 6, wherein the inner well region has a sealing region at the through opening, said sealing region being designed to rest in a sealing manner against the charging plug connector or against the fuel nozzle or tank filler pipe, wherein the sealing region and the inner well region are composed of the same material or comprise the same material and are formed integrally with one another, wherein the sealing region has at least one sealing lip.

9. The charging or fueling well as claimed in claim 1, wherein the outer well body has a sealing region, which is provided on an outer edge, insertable into the body opening, of the outer well body and is designed to rest in a sealing manner against the body opening, wherein the sealing region is formed integrally with the outer well body in an injection process, wherein the sealing region of the outer well body is formed from a plastics material which softer than the material of the outer well body.

10. The charging or fueling well as claimed in claim 1 wherein a lighting device having at least one light source is provided for backlighting the transparent or translucent plastics material of the inner well region or for coupling light into the transparent or translucent plastics material of the inner well region, wherein the at least one light source is designed to emit light in the visible wavelength range, or wherein the at least one light source is designed to emit light in the infrared range.

11. The charging or fueling well as claimed in claim 10, wherein at least one receptacle for accommodating the at least one light source in an exchangeable manner, is provided, in a peripheral edge region of the inner well region.

12. The charging or fueling well as claimed in claim 11, wherein the at least one receptacle is embodied as a channel which runs around the inner well region, at least in some region or regions, and is formed integrally with the plastics material of the inner well region.

13. The charging or fueling well as claimed in claim 10, wherein the at least one light source is designed for indirectly backlighting the transparent or translucent plastics material of the inner well region or for coupling light into the transparent or translucent plastics material of the inner well region, wherein the transparent or translucent plastics material of the inner well region is embodied at least in some region or regions as a light guide or is part of a light guide structure, via which light coupled into the transparent or translucent plastics material of the inner well region with the aid of the at least one light source can be guided to at least one light emission surface of the transparent or translucent plastics material.

14. The charging or fueling well as claimed in claim 13, wherein the transparent or translucent plastics material has a multiplicity of light emission surfaces at the edge region delimiting the through opening, wherein the at least one light emission surface is configured in such a way and/or arranged in such a way with respect to the through opening that it serves as a reference marker for an optical detection system of a manipulator for automatic charging.

15. The charging or fueling well as claimed in claim 10, wherein the at least one light source is assigned a control device for varying at least one of the following lighting parameters in accordance with a charge state of the battery, a filling level and/or in accordance with a state of the charging plug connector or the tank filler pipe:
a wavelength of the light emitted by the at least one light source;
an intensity of the light emitted by the at least one light source;
a flashing frequency of the light emitted by the at least one light source; and/or
a pulse shape and/or pulse frequency of the light emitted by the at least one light source.

16. The charging or fueling well as claimed in claim 1, wherein the charging or fueling well has a closure element, which is articulated on the outer well body and is designed to expose or cover at least the through opening for the charging plug connector or the fuel nozzle or the tank filler pipe when required.

17. A charging or fueling well for insertion into a body opening of a motor vehicle, comprising:
an outer well body and an inner well region, which surrounds a through opening, into which a charging plug connector for charging a battery of the motor vehicle or a fuel nozzle or tank filler pipe can be inserted;
wherein the outer well body is composed, at least in some region or regions, of an opaque or only slightly translucent plastics material, and the inner well region is composed, at least in some region or regions, of a transparent or translucent plastics material or comprises a transparent or translucent plastics material and is formed integrally with the material of the outer well body by being molded together with the material of the outer well body such that the inner well body and the outer well body are a monolithic structure;
wherein the inner well region is located axially below the outer well body;
wherein a receptacle is provided for at least one light source and comprises a channel which runs around at least part of the inner well region and is located axially below the inner well region.

18. The charging or fueling well as claimed in claim 17, wherein the outer well body is formed, at least in some region or regions, from a first plastics material, and the inner well region is formed, at least in some region or regions, from at least one second plastics material different from the first plastics material, and wherein the outer well body and the inner well region are formed in a multi-component injection process.

19. The charging or fueling well as claimed in claim 18, wherein the transparent or translucent plastics material of the inner well region is part of a light guide structure and is provided at least partially or at least in some region or regions on an edge region of the inner well region that delimits the through opening, and is designed to couple out light, coupled into the light guide structure with the aid of a light source, in the longitudinal direction of the charging or fueling well, at least in some region or regions or point-wise, in the edge region.

20. A charging or fueling well for insertion into a body opening of a motor vehicle, comprising:
an outer well body and an inner well region, which surrounds a through opening, into which a charging plug connector for charging a battery of the motor vehicle or a fuel nozzle or tank filler pipe can be inserted;
wherein the outer well body is composed, at least in some region or regions, of an opaque or only slightly translucent plastics material, and the inner well region is composed, at least in some region or regions, of a transparent or translucent plastics material or comprises a transparent or translucent plastics material and is formed integrally with the material of the outer well body by being molded together with the material of the outer well body such that the inner well body and the outer well body are a monolithic structure;
wherein the inner well region is located axially below the outer well body and the outer well body includes portions that extend axially down toward the inner well region;
wherein the inner well region includes a wall portion extending radially inward and downward toward the through opening and a sealing lip portion extending radially inward and upward from the wall portion toward an axis of the through opening for sealing against the charging plug connector or against the fuel nozzle or tank filler pipe.

* * * * *